United States Patent [19]
Pettijohn

[11] Patent Number: 5,852,399
[45] Date of Patent: Dec. 22, 1998

[54] DECELERATION WARNING SYSTEM

[76] Inventor: Susan J. Pettijohn, 726 Del Mar Ave., Novato, Calif. 94947

[21] Appl. No.: 974,059

[22] Filed: Nov. 19, 1997

[51] Int. Cl.[6] ................................................ B60Q 1/50
[52] U.S. Cl. ........................ 340/467; 340/456; 340/468; 340/479; 307/10.8
[58] Field of Search .................... 340/456, 463, 340/464, 466, 467, 468, 441, 479; 307/10.8

[56] References Cited

U.S. PATENT DOCUMENTS

| | | | |
|---|---|---|---|
| 4,105,994 | 8/1978 | Chicoine | 340/468 |
| 4,199,747 | 4/1980 | Miller et al. | 340/456 |
| 4,418,331 | 11/1983 | Chicoine | 340/467 |
| 4,970,493 | 11/1990 | Yim | 340/468 |
| 5,325,083 | 6/1994 | Nassar et al. | 340/456 |
| 5,646,457 | 7/1997 | Vakavtchiev | 340/456 |

Primary Examiner—Jeffery A. Hofsass
Assistant Examiner—Van T. Trieu

[57] ABSTRACT

A gear shift actuated deceleration indicator is provided including a gear shift module. A switch is included for indicating when the gear shift module switches from a first gear to a second lower gear. A brake light is mounted to a rear of the vehicle and is adapted for illuminating only upon the receipt of power. Finally, a control mechanism is connected between the switch and the brake light for transmitting power to the brake light upon the indication by the switch.

5 Claims, 2 Drawing Sheets

DECELERATION WARNING SYSTEM

BACKGROUND OF THE INVENTION

1. Field of the Invention

The present invention relates to brake lights and more particularly pertains to a new deceleration warning system for alerting a driver of a following vehicle when a leading vehicle is decelerating by way of downshifting.

2. Description of the Prior Art

The use of brake lights is known in the prior art. More specifically, brake lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art brake lights include U.S. Pat. No. 4,922,225 U.S. Pat. No. 4,107,647; U.S. Pat. No. 4,575,782; U.S. Pat. No. 4,806,782; U.S. Pat. No. 4,034,338; and U.S. Pat. No. Des. 332,234.

In these respects, the deceleration warning system according to the present invention substantially departs from the conventional concepts and designs of the prior art, and in so doing provides an apparatus primarily developed for the purpose of alerting a driver of a following vehicle when a leading vehicle is decelerating by way of solely downshifting.

SUMMARY OF THE INVENTION

In view of the foregoing disadvantages inherent in the known types of brake lights now present in the prior art, the present invention provides a new deceleration warning system construction wherein the same can be utilized for alerting a driver of a following vehicle when a leading vehicle is decelerating by way of solely downshifting.

The general purpose of the present invention, which will be described subsequently in greater detail, is to provide a new deceleration warning system apparatus and method which has many of the advantages of the brake lights mentioned heretofore and many novel features that result in a new deceleration warning system which is not anticipated, rendered obvious, suggested, or even implied by any of the prior art brake lights, either alone or in any combination thereof.

To attain this, the present invention generally comprises a gear shift module having a planar plate with a plurality of parallel oval cut outs. As shown in FIG. 2, a lateral cut out is formed in the plate. The lateral cut out communicates with a central extent of each of the parallel oval cut outs. Such cut outs allow the movement of a gear shift stick therein between front and rear ends of each oval cut out. Such ends of the oval cut outs each place the gear shift stick in a predetermined gear. As shown in FIG. 2, a switch is mounted between a pair of oval cut outs corresponding to a first and a third gear, respectively. The switch includes a first contact pivotally coupled adjacent the central lateral cut out and extends therein adjacent the oval cut out corresponding to the third gear. Associated therewith is a second stationary contact mounted adjacent the central lateral cut out and the cut out corresponding to the first gear. By this structure, the contacts are closed only upon the gear shift stick being maneuvered from the oval cut out corresponding to the third gear and an oval cut out corresponding to a second gear. A brake light is mounted to a rear of the vehicle for illuminating only upon the receipt of power. Finally, control means is connected between the switch and the brake light for transmitting power to the brake light upon the closing of the switch. It is imperative that the power is transmitted to the brake light for a period of time that is longer than a period of time that the switch is closed when the gear shift stick is maneuvered from the oval cut out corresponding to third gear to the oval cut out corresponding to second gear in a swift continues motion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out i-n various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new deceleration warning system apparatus and method which has many of the advantages of the brake lights mentioned heretofore and many novel features that result in a new deceleration warning system which is not anticipated, rendered obvious, suggested, or even implied by any of the prior art brake lights, either alone or in any combination thereof.

It is another object of the present invention to provide a new deceleration warning system which may be easily and efficiently manufactured and marketed.

It is a further object of the present invention to provide a new deceleration warning system which is of a durable and reliable construction.

An even further object of the present invention is to provide a new deceleration warning system which is susceptible of a low cost of manufacture with regard to both materials and labor, and which accordingly is then susceptible of low prices of sale to the consuming public, thereby making such deceleration warning system economically available to the buying public.

Still yet another object of the present invention is to provide a new deceleration warning system which provides in the apparatuses and methods of the prior art some of the advantages thereof, while simultaneously overcoming some of the disadvantages normally associated therewith.

Still another object of the present invention is to provide a new deceleration warning system for alerting a driver of a following vehicle when a leading vehicle is decelerating by way of solely downshifting.

Even still another object of the present invention is to provide a new deceleration warning system that includes a gear shift module. A switch is included for indicating when the gear shift module switches from a first gear to a second lower gear. A brake light is mounted to a rear of the vehicle and is adapted for illuminating only upon the receipt of power. Finally, a control mechanism is connected between the switch and the brake light for transmitting power to the brake light upon the indication by the switch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
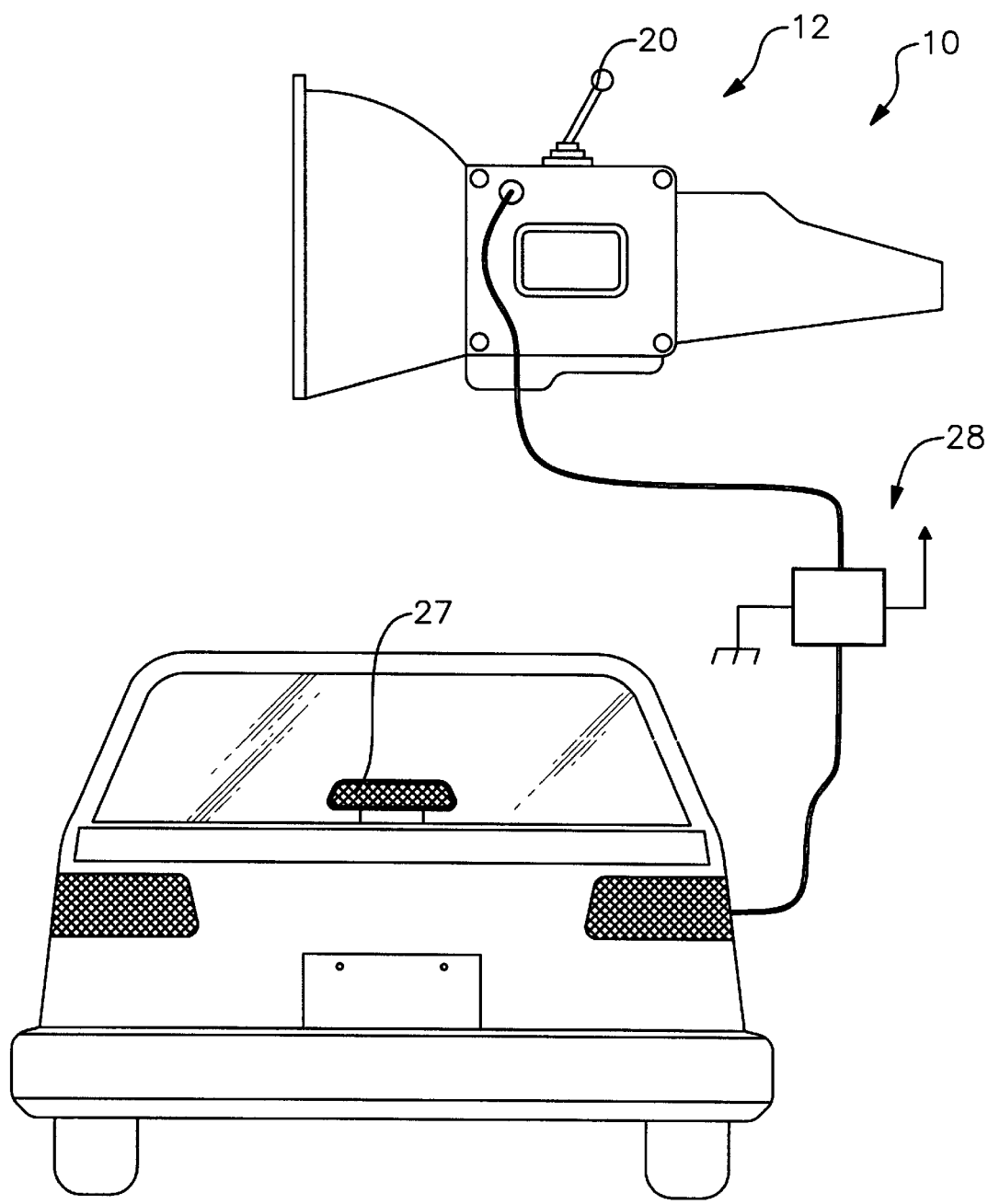
FIG. 1 is a side view of a new deceleration warning system according to the present invention.
Figure 2:
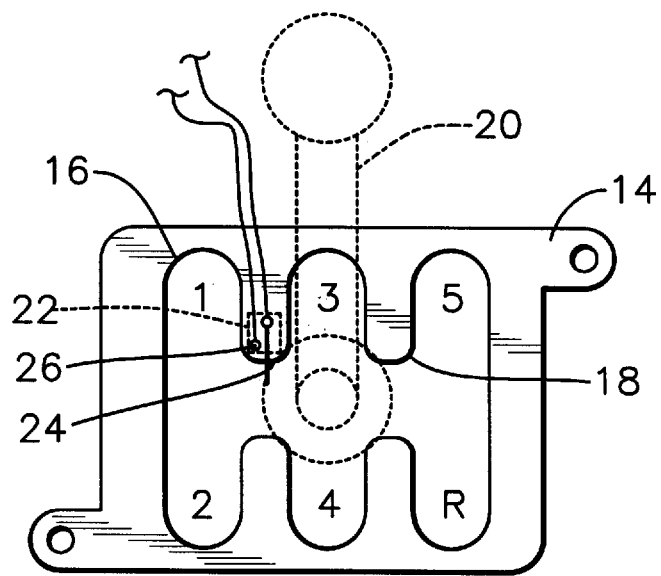
FIG. 2 is a top view of the present invention.
Figure 3:
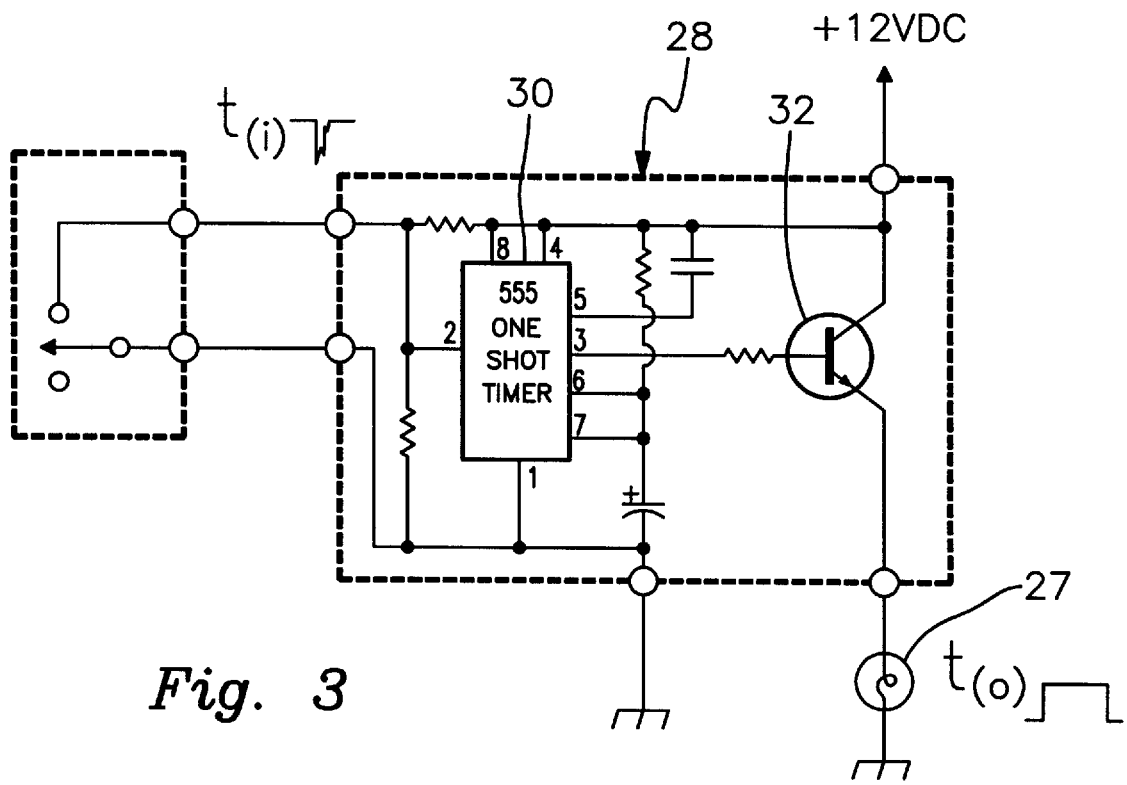
FIG. 3 is a schematic diagram of the present invention.

With reference now to the drawings, and in particular to FIGS. 1 through 3 thereof, a new deceleration warning system embodying the principles and concepts of the present invention and generally designated by the reference numeral 10 will be described.

The present invention, as designated as numeral 10, includes a gear shift module 12 having a planar plate 14 with a plurality of parallel oval cut outs 16. As shown in FIG. 2, a lateral cut out 18 is formed in the plate. The lateral cut out communicates with a central extent of each of the parallel oval cut outs. Such cut outs allow the movement of a gear shift stick 20 therein between front and rear ends of each oval cut out. Such ends of the oval cut outs each place the gear shift stick in a predetermined gear.

As shown in FIG. 2, a switch 22 is mounted between a pair of oval cut outs corresponding to a first and a third gear, respectively. The switch includes an elongated flexible first contact 24 pivotally coupled adjacent the central lateral cut out and extended therein adjacent the oval cut out corresponding to the third gear. Associated therewith is a second stationary contact 26 mounted adjacent the central lateral cut out and the cut out corresponding to the first gear.

By this structure, the contacts are closed only upon the gear shift stick being maneuvered from the oval cut out corresponding to the third gear and an oval cut out corresponding to a second gear. It is apparent from FIG. 2 that the gear shift stick fails to close the contacts of the switch when being shifted from second to third. In alternate embodiments, various other types of switches may be employed which only make contact when the gear shift stick is down shifting into second gear.

A brake light 27 is mounted to a rear of the vehicle for illuminating only upon the receipt of power. Such brake light may either comprise of conventional tail lights or an auxiliary light as shown in FIG. 1.

Finally, control means 28 is connected between the switch and the brake light for transmitting power to the brake light upon the closing of the switch. It is imperative that the power is transmitted to the brake light for a period of time that is longer than a period of time that the switch is closed when the gear shift stick is maneuvered in a swift continues motion from the oval cut out corresponding to third gear to the oval cut out corresponding to second gear.

To accomplish the foregoing function, the control means preferably comprises a 555 timer 30 having an RC network connected thereto such that a one-shot multivibrator is afforded. Such multivibrator has an input connected to the switch for transmitting a pulse from an output thereof upon at least the instantaneous closing of the switch. The pulse is preferably at least a couple seconds in duration. Such pulse is thereafter fed to a power transistor 32 which serves as a switch for supplying the brake light power during the duration of the pulse.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gear shift actuated deceleration indicator comprising, in combination:

a gear shift module including a planar plate having a plurality of parallel oval cut outs with a lateral cut out formed in the plate and communicating with a central extent of each of the parallel oval cut outs, the cut outs allowing the movement of a gear shift stick therein between front and rear ends of each oval cut out which each place the gear shift stick in a predetermined gear;

a switch mounted between a pair of oval cut outs corresponding to a first and a third gear, respectively, the switch including a first contact pivotally coupled adjacent the central lateral cut out and extending therein adjacent the oval cut out corresponding to the third gear and a second stationary contact mounted adjacent the central lateral cut out and the cut out corresponding to the first gear, whereby the contacts are closed only upon the gear shift stick being maneuvered from the oval cut out corresponding to the third gear and an oval cut out corresponding to a second gear;

a brake light mounted to a rear of the vehicle and adapted for illuminating only upon the receipt of power; and control means connected between the switch and the brake light for transmitting power to the brake light upon the closing of the switch, wherein the power is transmitted to the brake light for a period of time that is longer than a period of time that the switch is closed when the gear shift stick is maneuvered from the oval cut out corresponding to third gear to the oval cut out corresponding to second gear in a swift continuous motion.

2. A gear shift actuated deceleration indicator comprising:

a gear shift module;

a switch means for indicating when the gear shift module switches from a first gear to a second lower gear;

a brake light mounted to a rear of the vehicle and adapted for illuminating only upon the receipt of power; and control means connected between the switch means and the brake light for transmitting power to the brake light upon the indication by the switch;

wherein the control means includes a timer which is adapted to automatically transmit the power to the brake light for a predetermined period of time that is longer than a period of time that the switch indicates when the gear shift module is switching gears.

3. A gear shift actuated deceleration indicator as set forth in claim 2 wherein the gear shift module is a manual shift stick.

4. A gear shift actuated deceleration indicator as set forth in claim 3 wherein the switch means comprises a switch mounted to a plate with cut outs for allowing the manual shift stick to pass.

5. A gear shift actuated deceleration indicator as set forth in claim 2 wherein the first gear is third and the second gear is second.

\* \* \* \* \*